US012199949B2

(12) United States Patent
Zuk et al.

(10) Patent No.: US 12,199,949 B2
(45) Date of Patent: *Jan. 14, 2025

(54) PACKET CLASSIFICATION FOR NETWORK ROUTING

(71) Applicant: Palo Alto Networks, Inc., Santa Clara, CA (US)

(72) Inventors: Nir Zuk, Menlo Park, CA (US); Marc Joseph Benoit, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/478,478

(22) Filed: Sep. 29, 2023

(65) Prior Publication Data

US 2024/0031332 A1    Jan. 25, 2024

Related U.S. Application Data

(63) Continuation of application No. 17/839,614, filed on Jun. 14, 2022, now Pat. No. 11,811,731, which is a (Continued)

(51) Int. Cl.
*H04L 9/40* (2022.01)
*H04L 45/00* (2022.01)
(Continued)

(52) U.S. Cl.
CPC .......... *H04L 63/0227* (2013.01); *H04L 45/38* (2013.01); *H04L 45/64* (2013.01);
(Continued)

(58) Field of Classification Search
CPC ....... H04L 9/40; H04L 12/721; H04L 12/715; H04L 12/851; H04L 63/0227;
(Continued)

(56) References Cited

U.S. PATENT DOCUMENTS 6,678,827 B1 * 1/2004 Rothermel .............. H04L 41/22
709/229
7,464,407 B2   12/2008 Nakae
(Continued)

FOREIGN PATENT DOCUMENTS

CA      2620349       6/2017
CN      101977146     4/2013
(Continued)

OTHER PUBLICATIONS

Author Unknown, Open Networking Foundation, OpenFlow Switch Specification, Version 1.3.0 (Wire Protocol 0x04), Jun. 25, 2012.
(Continued)

*Primary Examiner* — Jayesh M Jhaveri
(74) *Attorney, Agent, or Firm* — Van Pelt, Yi & James LLP

(57) ABSTRACT

Techniques for packet classification for network routing are disclosed. In some embodiments, packet classification for network routing includes receiving packets associated with a new flow at a security controller from a network device, in which the network device performs packet forwarding; classifying the flow; and determining an action for the flow based on a policy (e.g., a security policy). In some embodiments, the network device is a Software Defined Network (SDN) network device (e.g., a packet forwarding device that supports the OpenFlow protocol or another protocol).

20 Claims, 9 Drawing Sheets

Related U.S. Application Data continuation of application No. 16/927,761, filed on Jul. 13, 2020, now Pat. No. 11,394,688, which is a continuation of application No. 15/250,156, filed on Aug. 29, 2016, now Pat. No. 10,757,074, which is a continuation of application No. 13/954,668, filed on Jul. 30, 2013, now Pat. No. 9,461,967.

(60) Provisional application No. 61/847,982, filed on Jul. 18, 2013.

(51) Int. Cl.
*H04L 45/64* (2022.01)
*H04L 47/2441* (2022.01)
*H04L 67/63* (2022.01)
*H04L 69/22* (2022.01)

(52) U.S. Cl.
CPC .......... *H04L 47/2441* (2013.01); *H04L 67/63* (2022.05); *H04L 69/22* (2013.01)

(58) Field of Classification Search
CPC ..... H04L 45/38; H04L 45/64; H04L 47/2441; H04L 67/327; H04L 69/22; H04L 67/63
See application file for complete search history.

(56) References Cited

U.S. PATENT DOCUMENTS

| | | | | |
|---|---|---|---|---|
| 8,619,799 | B1* | 12/2013 | Thodupunoori | .... H04L 47/2475 |
| | | | | 370/401 |
| 8,762,501 | B2 | 6/2014 | Kempf | |
| 8,769,664 | B1 | 7/2014 | Zuk | |
| 8,867,361 | B2 | 10/2014 | Kempf | |
| 9,461,968 | B2 | 10/2016 | Chang | |
| 10,608,899 | B2 | 3/2020 | Chennimalai Sankaran | |
| 2002/0083175 | A1* | 6/2002 | Afek | .................. H04L 63/1458 |
| | | | | 709/239 |
| 2003/0097557 | A1 | 5/2003 | Tarquini | |
| 2004/0030927 | A1 | 2/2004 | Zuk | |
| 2005/0129019 | A1 | 6/2005 | Cheriton | |
| 2006/0005231 | A1 | 1/2006 | Zuk | |
| 2006/0146816 | A1 | 7/2006 | Jain | |
| 2007/0006293 | A1* | 1/2007 | Balakrishnan | ...... H04L 63/0254 |
| | | | | 726/13 |
| 2007/0192863 | A1 | 8/2007 | Kapoor | |
| 2007/0297333 | A1 | 12/2007 | Zuk | |
| 2008/0253366 | A1 | 10/2008 | Zuk | |
| 2009/0328219 | A1 | 12/2009 | Narayanaswamy | |
| 2010/0232370 | A1 | 9/2010 | Jing | |
| 2011/0149734 | A1 | 6/2011 | Park | |
| 2011/0314145 | A1 | 12/2011 | Raleigh | |
| 2012/0026881 | A1 | 2/2012 | Zuk | |
| 2012/0084426 | A1 | 4/2012 | Zuk | |
| 2012/0093161 | A1 | 4/2012 | Yeap | |
| 2012/0120964 | A1 | 5/2012 | Koponen | |
| 2012/0304244 | A1* | 11/2012 | Xie | ..................... H04L 63/1425 |
| | | | | 726/1 |
| 2012/0304277 | A1 | 11/2012 | Li | |
| 2012/0327767 | A1* | 12/2012 | Ramakrishnan | .......... H04L 9/40 |
| | | | | 370/230 |
| 2013/0054761 | A1* | 2/2013 | Kempf | ................... H04L 47/781 |
| | | | | 709/221 |
| 2013/0232251 | A1 | 9/2013 | Pauley | |
| 2014/0033275 | A1 | 1/2014 | Kawamoto | |
| 2014/0098674 | A1 | 4/2014 | Sonoda | |
| 2014/0140213 | A1 | 5/2014 | Iny et al. | |
| 2014/0241247 | A1 | 8/2014 | Kempf | |
| 2014/0289840 | A1 | 9/2014 | Jain | |
| 2014/0331311 | A1 | 11/2014 | Zuk | |
| 2014/0337509 | A1 | 11/2014 | Manghirmalani | |

FOREIGN PATENT DOCUMENTS

| | | |
|---|---|---|
| CN | 102394885 | 7/2015 |
| JP | 2008011537 | 1/2008 |
| JP | 201398597 | 5/2013 |
| JP | 2013098597 | 5/2013 |
| WO | 2012141086 | 10/2012 |
| WO | 2012169164 | 12/2012 |

OTHER PUBLICATIONS

Author Unknown, Open Networking Foundation, Software-Defined Networking: The New Norm for Networks, ONF White Paper, Apr. 13, 2012.

Benton et al., OpenFlow Vulnerability Assessment, 2013, ACM.

Casado et al., Ethane: Taking Control of the Enterprise, SIGCOMM Computer Communication Review, ACM, 2007, vol. 37, No. 4.

Dely et al., CloudMac, An OpenFlow based Architecture for 802.11 MAC Layering Processing in the Cloud, 2012, IEEE.

Jarschel et al., Modeling and Performance Evaluation of an OpenFlow Architecture, 2011, ITC.

Mckeown et al., OpenFlow: Enabling Innovation in Campus Networks, Mar. 14, 2008.

Peresini et al., Is your OpenFlow Application Correct?, 2011, ACM.

* cited by examiner

PACKET CLASSIFICATION FOR NETWORK ROUTING

CROSS REFERENCE TO OTHER APPLICATIONS

This application is a continuation of U.S. patent application Ser. No. 17/839,614, entitled PACKET CLASSIFICATION FOR NETWORK ROUTING filed Jun. 14, 2022 which is incorporated herein by reference for all purposes, which is a continuation of U.S. patent application Ser. No. 16/927,761, entitled PACKET CLASSIFICATION FOR NETWORK ROUTING filed Jul. 13, 2020, now U.S. Pat. No. 11,394,688, which is incorporated herein by reference for all purposes, which is a continuation of U.S. patent application Ser. No. 15/250,156, now U.S. Pat. No. 10,757,074, entitled PACKET CLASSIFICATION FOR NETWORK ROUTING filed Aug. 29, 2016, which is a continuation of U.S. patent application Ser. No. 13/954,668, now U.S. Pat. No. 9,461,967, entitled PACKET CLASSIFICATION FOR NETWORK ROUTING filed Jul. 30, 2013, which claims priority to U.S. Provisional Patent Application No. 61/847,982 entitled PACKET CLASSIFICATION FOR NETWORK ROUTING filed Jul. 18, 2013, all of which are incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
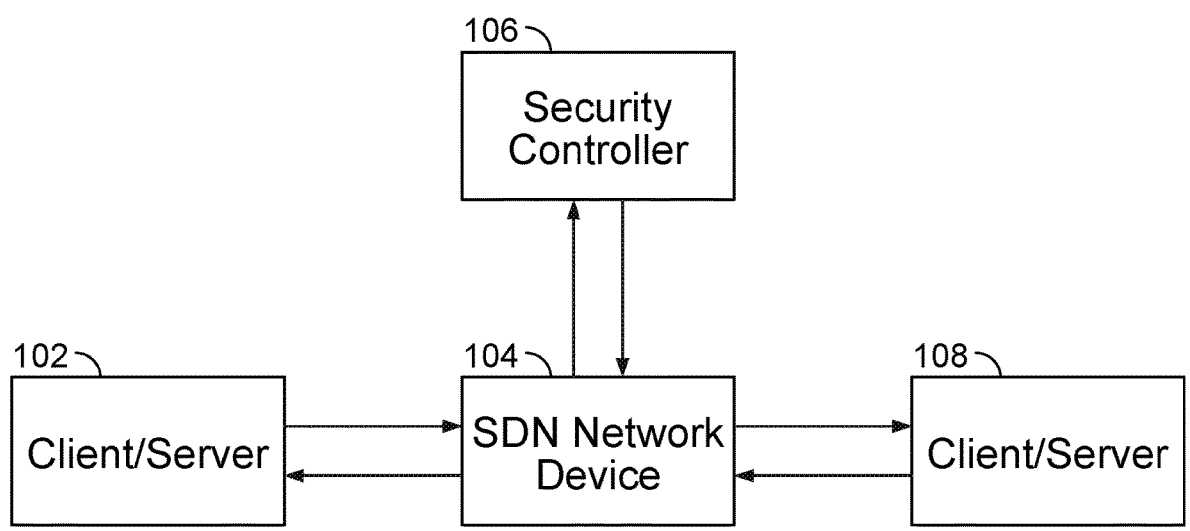
FIG. 1 is a functional diagram of a network architecture for providing packet classification for network routing in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, and intrusion prevention/detection, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances, generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Security devices (e.g., firewall appliances) that can implement such firewall techniques, including advanced firewall techniques, are typically integrated into traditional network architectures. However, new network architectures are evolving to meet the changing requirements of enterprises, carriers, and end users. For example, such a new networking approach employs a Software Defined Networking (SDN) architecture. The Open Networking Foundation (ONF) has defined various standards for the SDN architecture.

Specifically, Software Defined Networking (SDN) is an emerging network architecture in which network control is decoupled from forwarding (e.g., packet forwarding functionality) and is directly programmable. In the SDN architecture, the control and data planes are decoupled, network intelligence and state information are logically centralized, and the underlying network infrastructure is abstracted from the applications. ONF has defined a new standard protocol, referred to as the OpenFlow™ protocol. The OpenFlow protocol generally can be used to structure communications between the control plane and data plane of network devices (e.g., including across multiple vendors' network devices that support the OpenFlow protocol).

More specifically, OpenFlow is a standard communications interface defined between the control layer and forwarding layer of an SDN architecture (e.g., the OpenFlow Switch Specification is available at http://www.openflow.org/). In some implementations, OpenFlow supports direct access to and manipulation of the forwarding plane of network devices (e.g., switches, routers, and/or other network devices), both physical and virtual (e.g., hypervisor-based).

The SDN architecture thereby allows enterprises and carriers to have new levels of programmability, automation, and network control. Accordingly, SDN architectures can facilitate highly scalable, flexible networks that can efficiently and dynamically adapt to changing business needs.

However, such new network architectures that allow for new flexibility and programmability require new approaches to securing such networks (e.g., SDN networks and/or other network architectures that decouple the control and data planes). For example, the evolution of such dynamic network architectures that allows, for example, for programmability of flows between different network devices in an enterprise does not ensure that each flow would have to pass through a security device to enforce a security policy, such as an existing in-line firewall appliance.

Thus, what are needed are new techniques for packet classification for network routing. Accordingly, techniques for packet classification for network routing are disclosed. For example, various techniques for packet classification for network routing that can be applied to securing SDN networks (e.g., SDN networks and/or other network architectures that decouple the control and data planes) are disclosed.

In some embodiments, packet classification for network routing includes receiving packets associated with a new flow at a security controller from a network device, in which the network device performs packet forwarding; classifying the flow; and determining an action for the flow based on a policy (e.g., a security policy). In some embodiments, the network device is a Software Defined Network (SDN) network device (e.g., a packet forwarding device that supports the OpenFlow protocol or another protocol).

In some embodiments, packet classification for network routing further includes instructing the network device to perform the action for the flow (e.g., using an API mechanism and/or a tagging mechanism). Example actions can include the following actions: drop the flow, ignore the flow, and shunt the flow (e.g., instructing the security device to continue to send packets to the security controller for further analysis and classification(s)).

For example, SDN networks (e.g., SDN networks and/or other network architectures that decouple the control and data planes) can be used to provide for more flexible and dynamic network architectures that are used for various changing network patterns, such as resulting from an increasing use of various types of mobile devices by end users (e.g., including a rise in any device to any device from anywhere communication requirements), a rise in use of various private and public cloud services, and/or a growth of big data requiring greater bandwidth requirements (e.g., to support the movement of very large data sets across many servers, such as for parallel processing purposes). These trends also create significant security challenges for enterprises and/or service providers deploying such networks.

Accordingly, various techniques for packet classification for network routing are described herein that can be used to facilitate security in securing such SDN networks (e.g., SDN networks and/or other network architectures that decouple the control and data planes) and maintaining consistent security policies in such increasing network architecture complexities while maintaining efficient and scalable network solutions that are secured. For example, a security controller (e.g., a classification device or classification engine) can be provided that efficiently classifies network flows so that there is minimal impact to a networking device while providing packet classification information that allows packets to be more efficiently directed to their destination by the networking device.

In some embodiments, various techniques for providing packet classification for network routing can be implemented in a network architecture in which a network device identifies new flows and sends the identified new flows to a security controller (e.g., classification device or classification engine) that analyzes packets associated with each new flow to provide for a classification of each new flow, and the security controller then instructs the network device based on the classification and decision, to then perform an action (e.g., ignore, drop, shunt for further security analysis/classification, and/or other actions) on processing of each new flow. A particular problem that arises with SDN architectures that allow for open flows is that such network flows can be switched or routed anywhere (e.g., there is no guarantee that a given flow would have to pass through a security appliance/gateway or other security device that would typically be placed inline in typical network architectures), so a mechanism is needed to ensure that each new flow is inspected properly (e.g., for compliance with a security policy). Various techniques for providing packet classification for network routing in such network environments are further described below.

FIG. 1 is a functional diagram of a network architecture for providing packet classification for network routing in accordance with some embodiments. As shown, client device or server device 102 is in communication with client device or server device 108 via SDN network device 104 (e.g., a network device that is SDN-compliant/compatible, such as a switch, router, and/or another type of network device, which can be a physical network device and/or a virtual network device, such as hypervisor-based). As also shown, security controller 106 is provided that is in communication with SDN network device 104. In some embodiments, security controller 106 is in communication with multiple different SDN network devices.

In particular, FIG. 1 illustrates a simplified, logical view of an SDN architecture in accordance with some embodiments. For example, security intelligence can be logically centralized in software-based SDN controllers (e.g., security controller 106), which can maintain a global view of the network and ensure that security policies are consistently implemented across the SDN network. As another example, multiple different SDN network devices can be used to forward packets between client device or server device 102 and client device or server device 108. In some embodiments, security controller 106 is implemented using a cloud security service, in which packets can be communicated (e.g., using a secure protocol, such as the OpenFlow protocol or another secure protocol, which can provide for secure communications over public networks, such as the Internet) from SDN network devices for classification of (new) flows using various techniques as described herein with respect to various embodiments.

In some implementations, security controller 106 is provided as a secondary controller of SDN network devices (e.g., SDN network device 104) in the SDN architecture, in which primary controllers are provided for providing primary logical control for the SDN network devices (e.g., for providing basic switching and routing logical functions). In some implementations, security controller 106 is provided as a secondary controller of SDN network devices (e.g., SDN network device 104) in the SDN architecture, in which the secondary controller can be integrated with a primary controller and/or executed as a separate engine(s) (e.g., implemented in software executed on a processor(s) of the device, implemented in hardware such as an FPGA or other hardware implementation, and/or implemented using a combination of software and hardware) on a device that also executes an engine(s) for a primary controller. In some implementations, security controller 106 is provided as a secondary controller of SDN network devices (e.g., SDN network device 104) in the SDN architecture, in which the secondary controller can be provided on a second device that executes an engine(s) for the secondary controller, and in which a first device executes an engine(s) for the primary controller. In some implementations, the secondary controller and/or the primary controller can be implemented in software executed on a device (e.g., appliance, server, and/or other computing device), implemented in hardware of the device, and/or a combination thereof.

In some embodiments, SDN network device 104, such as a switch or a router (e.g., an L2 network device, an L3 network device, or an L2/L3/L7 device), passes packets of a flow to security controller 106. In some embodiments, security controller 106 is capable of performing various packet classification techniques (e.g., including application identification (APP-ID), user identification (USER-ID), and/or other firewall and/or advanced firewall related classification techniques and state-based flow classification techniques, such as described herein).

In some embodiments, SDN network device 104 networking device uses the classification in the packet to more efficiently direct the packet (e.g., how to switch/route the packet, whether to drop the packet, and/or some other action to perform) such as further described herein with respect to various embodiments. In some embodiments, security controller 106 classifies a packet of a new flow and associates the classification with the packet (e.g., using a tagging mechanism to tag the packet, such as described herein) before returning the packet to SDN network device 104, such as further described herein with respect to various embodiments. In some embodiments, security controller 106 classifies a packet of a new flow and instructs the SDN network device 104 on how to process the flow based on the classification using an API mechanism, such as further described herein with respect to various embodiments. For example, if the classification device determines that it is no longer necessary to classify packets of a given flow (e.g., further classification of the flow will not occur or is unlikely), a message (e.g., ignore action instruction) can be sent to the SDN network device informing it that packets of the specified flow no longer need to be sent to the classification device.

In some implementations, an SDN network device and a primary controller can be provided by commercially available solutions from, for example, Arista Networks, Cisco Systems, and/or other commercial networking vendors. In some implementations, an SDN network device and a primary controller can be provided by a virtual switch (e.g., a software based switch), such as a proprietary virtual switch and/or an open sourced virtual switch such as provided by OpenvSwitch (e.g., available at http://openvswitch.org). In some implementations, security controller 106 is provided by a commercial security vendor, such as Palo Alto Networks, which provides various Next Generation FireWall (NGFW) solutions. For example, an SDN network device from Arista Networks can recognize a new flow and send the new flow to a Palo Alto Networks security controller (e.g., a security appliance and/or security engine that can classify flows and apply policies based on classified flows to instruct SDN networks on how to handle such flows based on a security policy). In particular, the Palo Alto Networks security controller can classify a flow and make a decision on how to process the classified flow (e.g., drop, such as based on an ACL based on 5-tuple to drop all packets for the remainder of that flow; shunt, such as if a policy indicates that the flow should be inspected further in which case the security controller can be effectively placed inline to monitor all of the traffic for that flow; or ignore, such as if a policy indicates to leave that flow alone—do not drop and do not further inspect).

For example, an NGFW solution can be provided as a security controller 106. The SDN network device 104 can send all new flows to security controller 106 for inspection (e.g., which can be configured to inspect a predetermined minimum number of packets of each new flow for initial classification). In some cases, the NGFW solution can be implemented in hardware on SDN network device 104. SDN network device 104 receives a new flow, forwards a predetermined number of packets to security controller 106 for classification and analysis (e.g., based on a policy, such as a security policy), and SDN network device 104 can either wait for a response from the security controller (e.g., via open flow or API) or install the flow into hardware (e.g., fast path). If an assessment is returned from the security controller with an action (e.g., drop), then the SDN network device would create the appropriate rule (e.g., Access Control List (ACL)) and drop the corresponding traffic. In particular, security controller 106 can classify a flow for the following actions: drop, shunt, ignore. For the first two actions (i.e., drop or shunt), security controller 106 can instruct SDN network device 104 via, for example, OpenFlow or direct API communication to perform the action. In the shunt case, all traffic from that flow would be directed to security controller 106 for continuing inspection (e.g., the security controller is effectively placed inline for the shunted flow). Ignore would require no signaling as the specific flow is already installed in the forwarding table of SDN network device 104.

In some embodiments, security controller 106 includes various classification functions, such as various layer-2, layer-3, and higher layer classification engines, such as application identification engine, user identification engine, and/or can perform various other firewall-based classification and advanced firewall classification techniques, such as described herein, which, for example, can be implemented using computing hardware, software, or various combinations thereof.

As further described below with respect to FIG. 2, the classification performed by a security controller can be implemented as a separate device, within the networking device, as a virtual machine, and/or using various other techniques.

Figure 2:
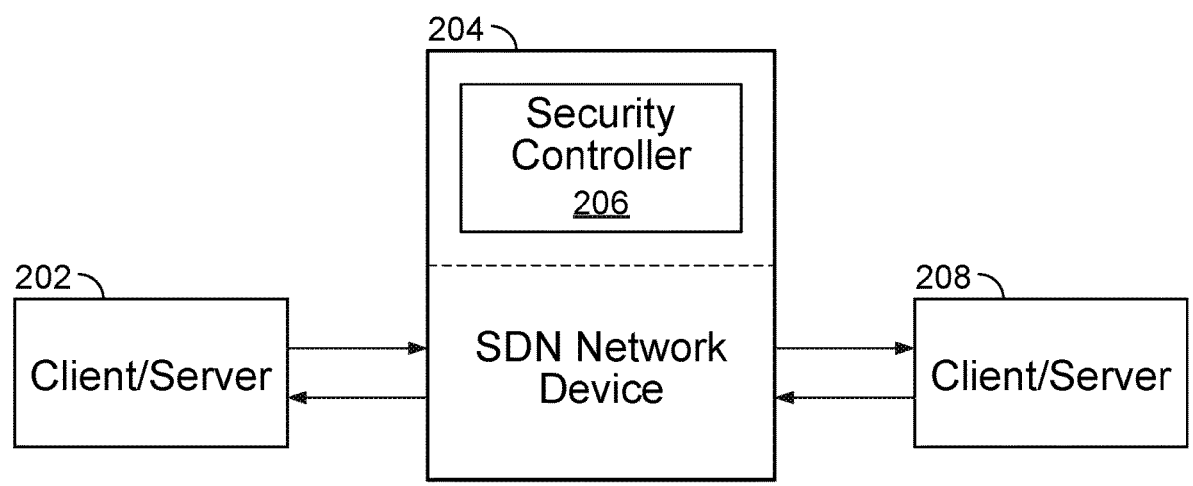
FIG. 2 is another functional diagram of a network architecture for providing packet classification for network routing in accordance with some embodiments.

FIG. 2 is another functional diagram of a network architecture for providing packet classification for network routing in accordance with some embodiments. As shown, client device or server device 202 is in communication with client device or server device 208 via SDN network device 204 (e.g., a network device that is SDN-compliant/compatible, such as a switch, router, and/or another type of network device, which can be a physical network device and/or a virtual network device, such as hypervisor-based). As also shown, security controller 206 is provided that is integrated with SDN network device 204. For example, security controller 206 can be implemented in hardware on SDN network device 204. As another example, security controller 206 can be implemented in software executed on a processor(s) of SDN network device 204. In some implementations, security controller 206 is implemented in a control layer of SDN network device 204 as shown.

As will now be apparent, some or all of the functions described herein can be assisted by or implemented in whole or in part by a security controller that can be implemented as a separate security controller device, a security controller device that is implemented as an integrated part of an SDN network device, as hardware, as a software-based solution executed on a physical device, a virtual network device, such as hypervisor-based, and/or as a security cloud service. A security cloud service can, for example, reduce the processing on the SDN network device. As another example, detection of security policy violations and/or vulnerabilities can be reported to a security cloud service.

Figure 3:
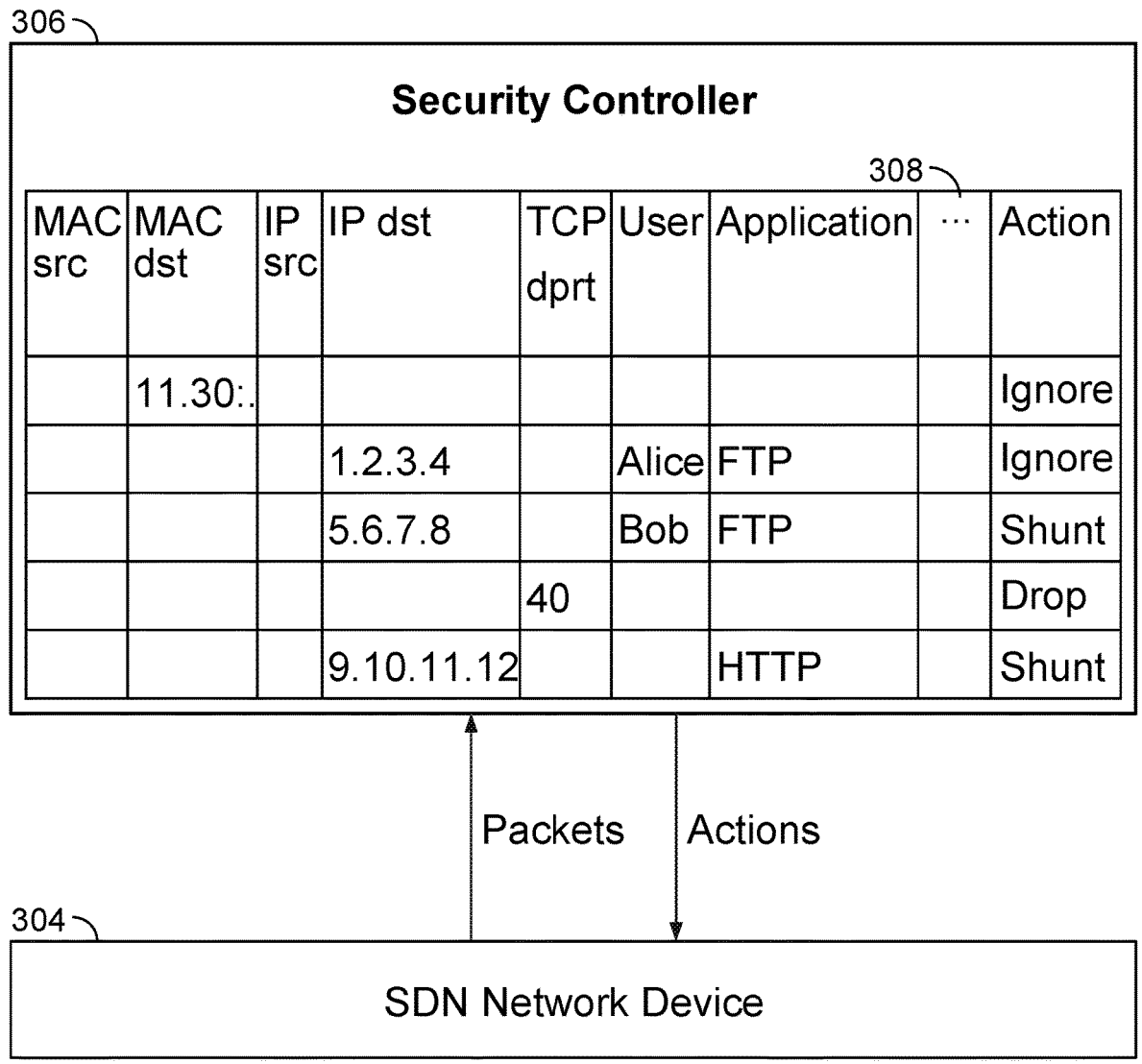
FIG. 3 is a functional diagram of a security controller for providing packet classification for network routing in accordance with some embodiments.

FIG. 3 is a functional diagram of a security controller for providing packet classification for network routing in accordance with some embodiments. As shown, SDN network device 304 (e.g., a network device that is SDN-compliant/compatible, such as a switch, router, and/or another type of network device, which can be a physical network device and/or a virtual network device, such as hypervisor-based) is in communication with security controller 306. In this embodiment, security controller 306 is shown as integrated with SDN network device 304. For example, security controller 306 can be implemented in hardware on SDN network device 304. As another example, security controller 306 can be implemented in software executed on SDN network device 304 (e.g., or implemented using a combination of hardware and software). In some implementations, a security controller 306 is implemented in a device, and a separate, distinct device implements a primary controller (e.g., primary controllers are provided for providing primary logical control for the SDN network devices, such as for providing basic switching and routing logical functions that can be communicated to SDN network device 304).

In some embodiments, a protocol, such as the OpenFlow protocol, is implemented on both sides of an interface between network infrastructure devices (e.g., SDN network device) and the SDN control software (e.g., a security controller). In some embodiments, the flows identified using OpenFlow techniques can be used by a security controller (e.g., security controller 306) for providing packet classification for network routing. For example, OpenFlow uses the concept of flows to identify network traffic based on predefined match rules that can be statically or dynamically programmed by SDN control software. A policy, such as a security policy, can be configured to define how traffic should flow through network devices based on parameters, such as applications, users, devices, cloud resources, malware related information, source/destination information, device information, and/or other information. Accordingly, OpenFlow can be used to program the network on a per-flow basis, which provides granular control over the network to respond to real-time changes at the application, user, and session levels.

For example, a security controller (e.g., security controller 306) can analyze flows forwarded from the data plane (e.g., SDN network device 304), determine how to handle such flows based on a policy (e.g., a security policy), and provide instructions (e.g., based on actions) for manipulation of the forwarding plane of network devices (e.g., SDN network device 304). As would be apparent to one of ordinary skill in the art, such OpenFlow-based SDN techniques can be deployed on existing networks, both physical and virtual. As also would be apparent, such network devices can support OpenFlow-based forwarding as well as traditional forwarding, which allows enterprises and carriers to progressively introduce OpenFlow-based SDN technologies, even in multi-vendor network environments.

Referring to FIG. 3, security controller 306 includes a flow classification table 308. SDN network device 304 identifies new flows and can be configured to forward packets of new flows to security controller 306 (e.g., which may require receiving a sufficient number of packets for the flow to obtain sufficient information for classifying the flow and to make a determination for an action for the classified flow based on security policy). Security controller 306 then analyzes packets for each new flow to perform a classification for each new flow. Flow classification table 308 includes various information for each analyzed flow, including a MAC source (MAC src), MAC destination (MAC dst), IP source (IP src), IP destination (IP dst), TCP destination port (TCP dprt), user (User ID), application (APP ID), and possibly other information. Based on this information for each flow and based on a policy (e.g., a security policy), security controller 306 can determine an action to instruct SDN network device 304 to perform against the flow. Example actions can include ignore, shunt, drop, and/or various other actions. For example, known malicious traffic can be dropped, or applications that are not allowed based on a security policy (e.g., music streaming, voice over IP, and/or other applications) can be dropped. As another example, certain application traffic may be allowed based on a user (e.g., Alice may be allowed to use FTP, but Bob may not be allowed to use FTP over the enterprise network of ACME Corporation), in which case if it is allowed, then the action can be to ignore (e.g., SDN network device can be instructed to not send further packets associated with that flow to security controller 306), but if it may not be allowed, then the action can be to drop or to shunt (e.g., SDN network device can be instructed to send further packets associated with that flow to security controller 306 for further inspection to determine whether the flow should be dropped or ignored). As yet another example, certain flows may require further inspection to make a determination on whether to allow or block such flows, such as HTTP traffic (e.g., certain HTTP traffic may be allowed and other HTTP traffic may be blocked based on a security policy, which can also depend on a user and/or other information associated with the flow, such as for an evolving web session related flow, in which, for example, a web browser initially visits a search engine home page to perform standard web searching but then navigates user to a web-based chat service that may not be allowed such that further monitoring and inspection of such a flow can be required for ensuring security policy compliance for that flow). As a further example, for a long-running, high-throughput flow (e.g., elephant flow, such as for storage area network traffic, and/or other permissible, high volume data flows), security controller 306 can instruct SDN device 304 to ignore such flows to bypass further security processing (e.g., analysis and classification using the security controller).

In some embodiments, security controller 306 is provided to implement various network services, including security services (e.g., based on a policy, such as a security policy that can be customized/configured for an enterprise). For example, an enterprise can define and enforce consistent security policies across both wired and wireless connections on an enterprise network using various techniques described herein. As another example, an enterprise can implement secure cloud services using various techniques described herein.

In some embodiments, a set of APIs for security services (e.g., an API mechanism) is provided to facilitate communication between security controller 306 and SDN network device 304 to allow security controller 306 to communicate various security related instructions based on packet/flow classification implemented using security controller 306. In some implementations, a set of APIs for security services can be defined as public or open APIs that can facilitate support across different vendors, in which different devices (e.g., SDN network devices) can be configured to support and interoperate with such public, open APIs for security services. In some implementations, the APIs for security services can be standardized to facilitate interoperability and support by devices provided by various commercial vendors.

In some embodiments, an API mechanism is used by a security controller (e.g., security controller 306) to instruct a network device (e.g., SDN network device 304) using API communications. For example, the security controller can directly pass classification decisions or instructions to a network device via API communication(s). An example communication is an HTTPS post to a REST-based API indicating that the network device should, for example, drop the flow, such as, the following HTTPS post: https://sdndevice/api/flowID=000000000854&flowACTION=drop&key=6TGM9bXcwM3JHU G where flowID represents the unique identifier for the flow and flowACTION represents an action associated with a classification, such as DROP/SHUNT/IGNORE.

In some embodiments, a tagging mechanism is used by a security controller (e.g., security controller 306) to instruct a network device (e.g., SDN network device 304) using a protocol (e.g., OpenFlow protocol and/or another protocol). In some implementations, the packet can be marked or tagged using a security controller to communicate an action (e.g., security controller 306 can add metadata to a packet flow for SDN devices using a tag, such as a standardized OpenFlow tag). The security controller can also directly communicate classification information with the networking device via OpenFlow controller-to-switch mechanisms or directly mark the packet utilizing OpenFlow or other protocols to embed meta-data regarding the classification of the flow or to affect the forwarding of the flow. When a packet arrives that does not match any flow table entry, the networking device can provide a copy or forward the packet to the security controller for classification, once classified the security controller can define a new flow for that packet and send the entry or entries to the networking device to be added to the flow table. An instruction can also be added by the security controller to add a value called metadata to a packet, which will be matched against the metadata value in the flow table entries. Actions and priorities can also be inserted to affect the forwarding of the packet, reclassification, and/or rewriting packet information such as source or destination Internet protocol addresses. For example, metadata can be set to drop, shunt, or ignore to provide instruction to the network device, or action can be set to simply drop the flow via an empty instruction set or to a more complex instruction set such as output:5, security-controller where the packet will be forwarded via port number 5 and output packet to the security-controller for classification.

For example, using various techniques described herein, an Information Technology (IT) administrator (e.g., network admin or security admin) can define high-level configuration and policy statements for security of an enterprise network, which are then automatically translated to the network infrastructure using OpenFlow to maintain a consistent security policy across the enterprise network (e.g., which can include many different network devices, including from different vendors). Accordingly, by implementing such an OpenFlow-based SDN architecture, the IT admin is not required to individually configure network devices each time an end point, service, or application is added or moved, or a security policy changes, which reduces the risks of policy inconsistencies and/or other security risks due to improper network device configurations. The use of such security controllers in SDN network architectures can also provide for a consistent enforcement of a security policy across the wired and wireless network infrastructures, including branch offices, campuses, and data centers.

Figure 4:
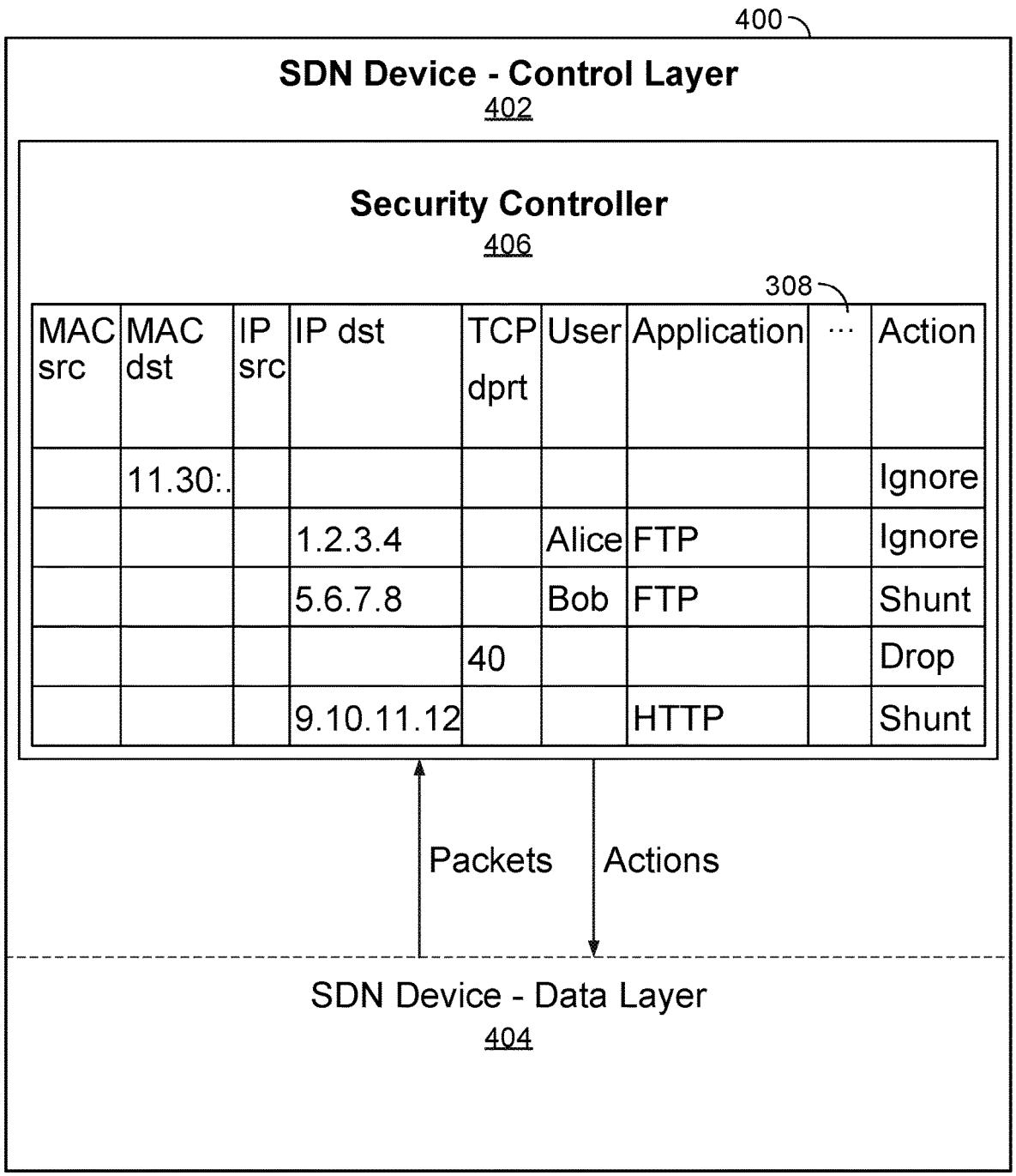
FIG. 4 is another functional diagram of a security controller for providing packet classification for network routing in accordance with some embodiments.

FIG. 4 is another functional diagram of a security controller for providing packet classification for network routing in accordance with some embodiments. As shown, SDN network device 400 (e.g., a network device that is SDN-compliant/compatible, such as a switch, router, and/or another type of network device, which can be a physical network device and/or a virtual network device, such as hypervisor-based) is in communication with security controller 406. In this embodiment, security controller 406 is shown as integrated with SDN network device 400. For example, security controller 406 is can be implemented in hardware on SDN network device 400. As another example, security controller 406 is can be implemented in software executed on SDN network device 400 (e.g., or implemented using a combination of hardware and software). In some implementations, security controller 406 is implemented in control layer 402 of SDN network device 400, and SDN device logic is implemented in data layer 404 of SDN network device 400, as shown.

Figure 5:
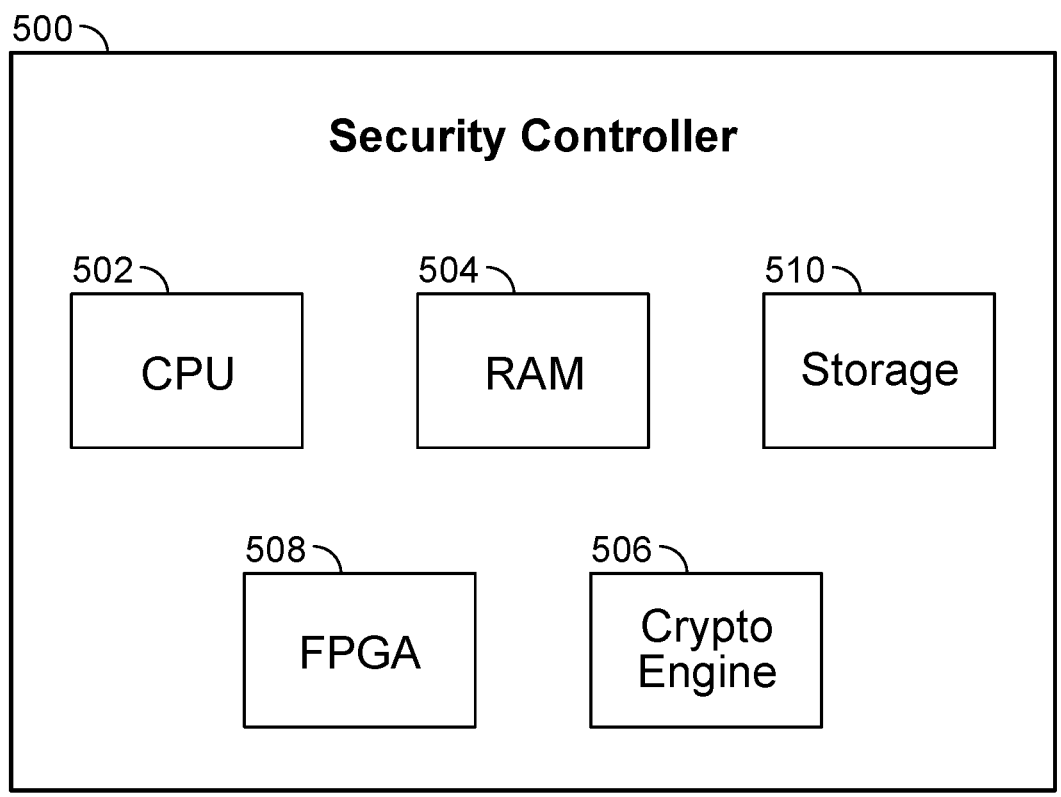
FIG. 5 is a block diagram of various components of a security controller for providing packet classification for network routing in accordance with some embodiments.

FIG. 5 is a block diagram of various components of a security controller 500 for providing packet classification for network routing in accordance with some embodiments. The example shown is a representation of physical components that can be included in a security controller (e.g., security controller 106 or security controller 206). Specifically, security controller 500 includes a high performance multi-core CPU 502 and RAM 504. Security controller 500 also includes a storage 510 (e.g., one or more hard disks or solid state storage units), which is used to store policy and other configuration information as well as signatures. Security controller 500 can also include one or more optional hardware accelerators. For example, security controller 500 can include a cryptographic engine 506 configured to perform encryption and decryption operations, and one or more FPGAs 508 configured to perform signature matching, act as network processors, and/or perform other tasks.

Figure 6:
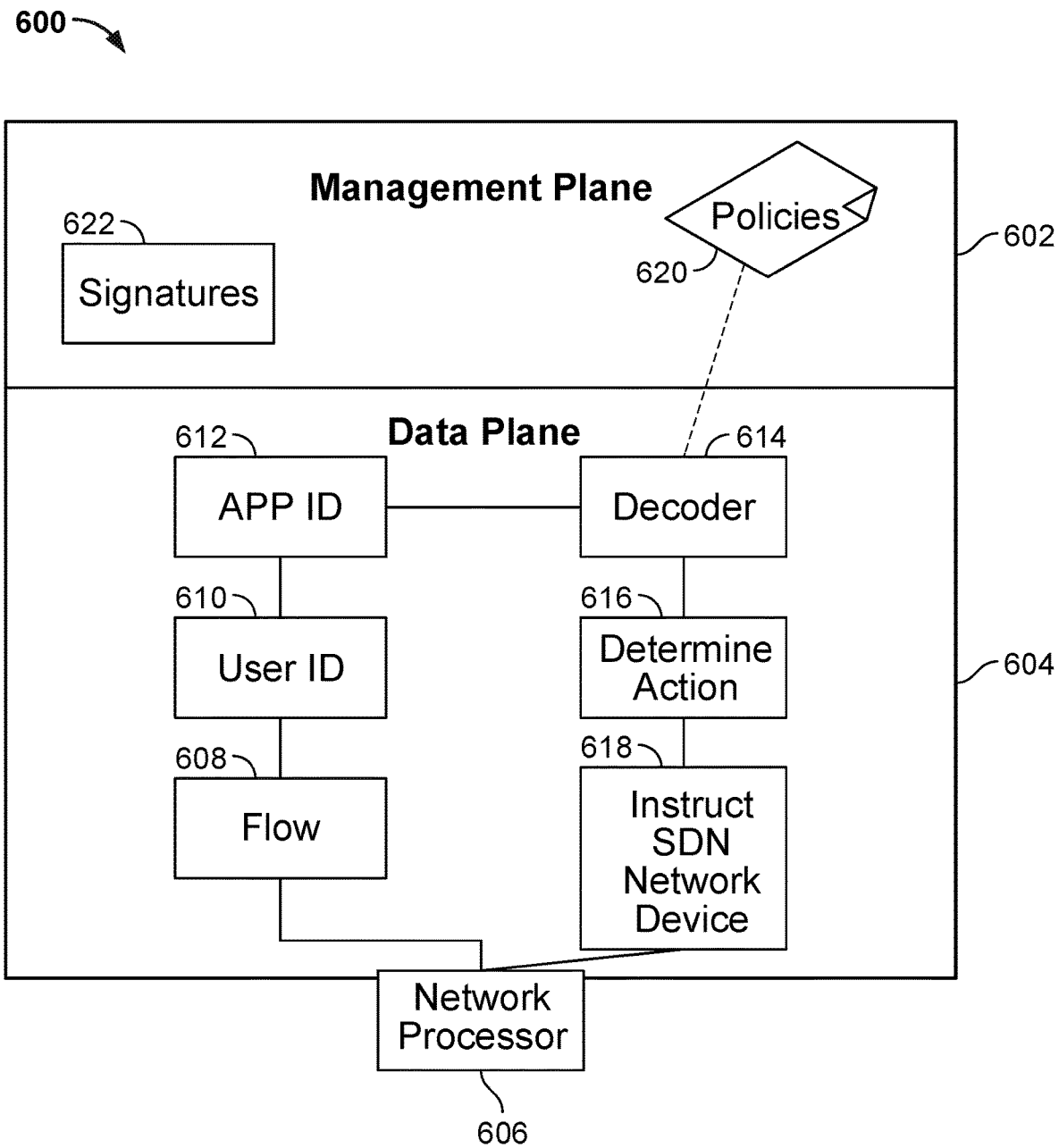
FIG. 6 is a functional diagram of logical components of a security controller for providing packet classification for network routing in accordance with some embodiments.

FIG. 6 is a functional diagram of logical components of a security controller 600 for providing packet classification for network routing in accordance with some embodiments. The example shown is a representation of logical components that can be included in security controller 600. As shown, security controller 600 includes a management plane 602 and a data plane 604. In some embodiments, the management plane is responsible for managing user interactions, such as by providing a user interface for configuring policies, such as policies 620 as shown, and viewing log data. The data plane is responsible for managing data, such as by performing packet processing and session handling.

Network processor 606 is configured to receive packets of new flows from SDN network devices, and provide the packets to data plane 604 for processing. Flow 608 identifies the packets as being part of a new session and creates a new session flow. Subsequent packets will be identified as belonging to the session based on a flow lookup. If applicable, SSL decryption is applied using, for example, an SSL decryption engine using various techniques as described herein. User identification module 610 is configured to identify a user associated with the traffic flow. Application identification module 612 is configured to determine what type of traffic the session involves, such as HTTP traffic, HTTPS traffic, FTP traffic, SSL traffic, SSH traffic, DNS requests, unclassified application traffic (e.g., unknown application traffic), and/or other types of traffic (e.g., traffic using other types of known or unknown protocols). For example, application identification module 612 can recognize a GET request in the received data and conclude that the session requires an HTTP decoder. For each type of protocol, there exists a corresponding decoder 614. Based on the determination made by application identification module 612, the packets of each flow are sent to an appropriate decoder 614. Decoder 614 is configured to assemble packets (e.g., which may be received out of order) into the correct order, perform tokenization, and extract out information (e.g., to identify username/password credentials being submitted to an external site for user authentication). Decoder 614 also performs signature matching to determine what should happen to the packet. In some embodiments, decoding also includes performing SSL encryption (e.g., using an SSL encryption/decryption engine(s)) using various techniques as described herein. Based on results of the data plane processing using flow 608, user ID module 610, application ID module 612, and decoder 614, an action determination is performed as shown at 616. Based on the determined action (616), the SDN network device is instructed to perform an action as shown at 618. As also shown, signatures 622 are received and stored in the management plane 602. In some embodiments, policy enforcement (e.g., policies 620 can include one or more rules, which can be specified using domain and/or host/server names, and rules can apply one or more signatures or other matching criteria or heuristics, such as for providing security policy for an enterprise network) using signatures are applied as described herein with respect to various embodiments based on the monitored, decrypted, identified, and decoded session traffic flows.

Figure 7:
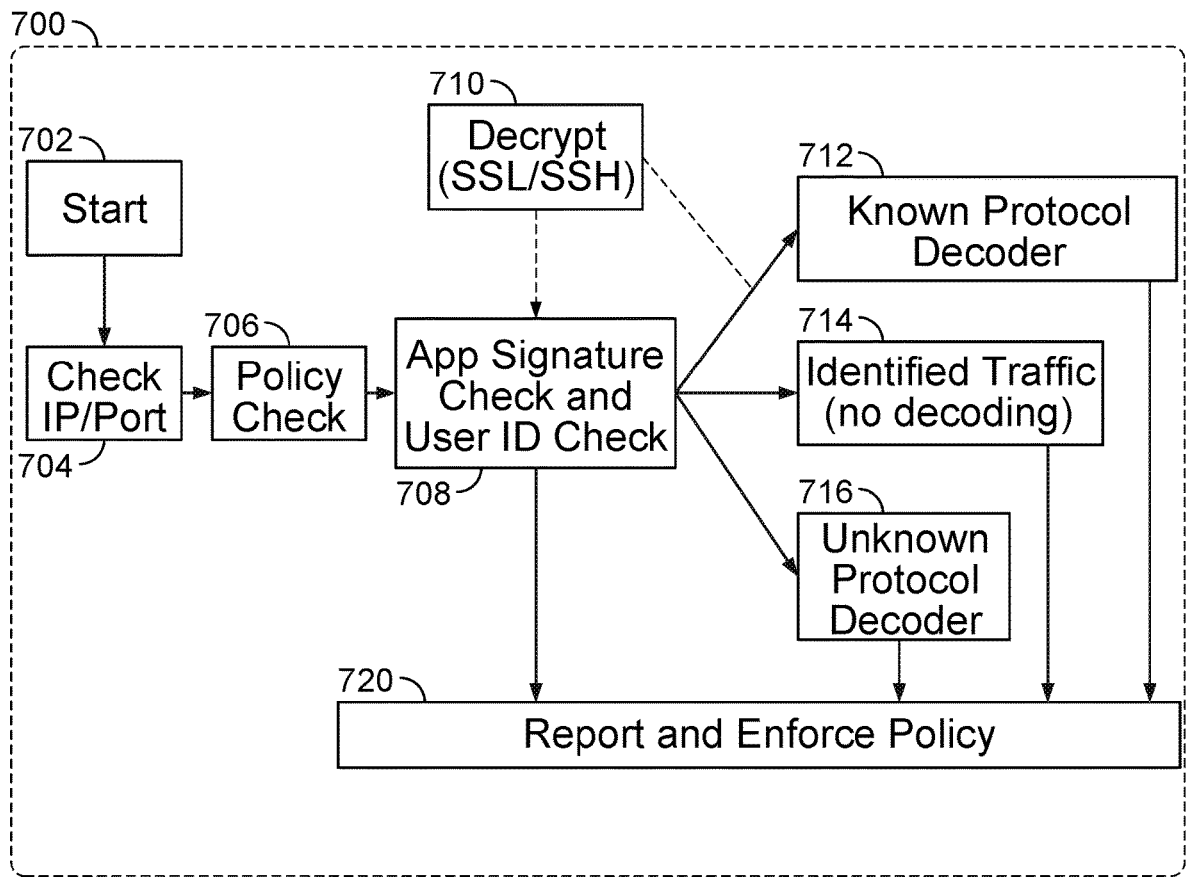
FIG. 7 is a functional diagram of an architecture of a security controller that can be used for providing packet classification for network routing in accordance with some embodiments.

FIG. 7 is a functional diagram of an architecture of a security controller that can be used for providing packet classification for network routing in accordance with some embodiments. As shown, network traffic is monitored at security controller 700. In some embodiments, packets associated with new traffic flows are received from SDN network devices for analysis by security controller 700, which can then determine an action based on a packet classification of packets associated with each new flow and based on a policy (e.g., a security policy) as described herein with respect to various embodiments.

In some embodiments, traffic flows are monitored using a state-based firewall. In some embodiments, the state-based firewall can monitor traffic flows using an APP-ID engine (e.g., App Signature Check & User ID Check 708). For example, the monitored network traffic can include HTTP traffic, HTTPS traffic, FTP traffic, SSL traffic, SSH traffic, DNS requests, unclassified application traffic (e.g., unknown application traffic), and/or other types of traffic (e.g., traffic using other types of known or unknown protocols).

As shown in FIG. 7, network traffic monitoring begins at 702. An IP address and port engine 704 determines an IP address and port number for a monitored traffic flow (e.g., a session) based on packet analysis. A policy check engine 706 determines whether any policies can be applied based on the IP address and port number. In some implementations, a user ID check engine and an App-ID engine can be implemented in an app signature check and user ID check engine 708 as shown, or can be implemented in separate engines or modules. For example, a user identification can be determined for a flow, for example, using user ID check engine 708 (e.g., user ID can be deduced based on the source IP address). As also shown in FIG. 7, an application signature check engine 708 identifies an application (e.g., using an APP-ID engine using various application signatures for identifying applications based on packet flow analysis). For example, APP-ID engine 708 can be configured to determine what type of traffic the session involves, such as HTTP traffic, HTTPS traffic, FTP traffic, SSL traffic, SSH traffic, DNS requests, unknown traffic, and various other types of traffic, and such classified traffic can be directed to an appropriate decoder, such as decoders 712, 714, and 716, to decode the classified traffic for each monitored session's traffic flow. If the monitored traffic is encrypted (e.g., encrypted using HTTPS, SSL, SSH, or another known encryption protocol), then the monitored traffic can be decrypted using a decrypt engine 710 (e.g., applying trusted man-in-the-middle techniques using a self-signed certificate). A known protocol decoder engine 712 decodes and analyzes traffic flows using known protocols (e.g., applying various signatures for the known protocol) and reports the monitored traffic analysis to a report and enforce policy engine 720. Identified traffic (no decoding required) engine 714 reports the identified traffic to the report and enforce policy engine 720. An unknown protocol decoder engine 716 decodes and analyzes traffic flows (e.g., applying various heuristics) and reports the monitored traffic analysis to the report and enforce policy engine 720. For example, the report and enforce policy engine 720 can communicate action instructions to the SDN network devices (e.g., drop, ignore, or shunt a flow).

In some embodiments, the results of the various traffic monitoring techniques using known protocol decoder engine 712, identified traffic engine 714, and unknown protocol decoder engine 716 described above are provided to report and enforce policy engine 720 (e.g., network/routing policies, security policies, and/or firewall policies). For example, firewall policies can be applied to the monitored network traffic using application identification, user identification, and/or other information to match signatures (e.g., file-based, protocol-based, and/or other types/forms of signatures for detecting malware or suspicious behavior).

In some embodiments, security controller 700 also includes a content-ID engine (not shown), and, in some embodiments, the content-ID engine's identified content is also used by report and enforce policy engine 720, possibly in various combinations with other information, such as application, user, and/or other information, to enforce various security/firewall policies/rules.

In some embodiments, various other functional architectures and flows are provided to implement techniques for providing packet classification for network routing as described herein. For example, some of these functions can be implemented in software executed on a general processor and/or some of these functions can be implemented using hardware acceleration techniques for faster packet processing of network traffic.

Figure 8:
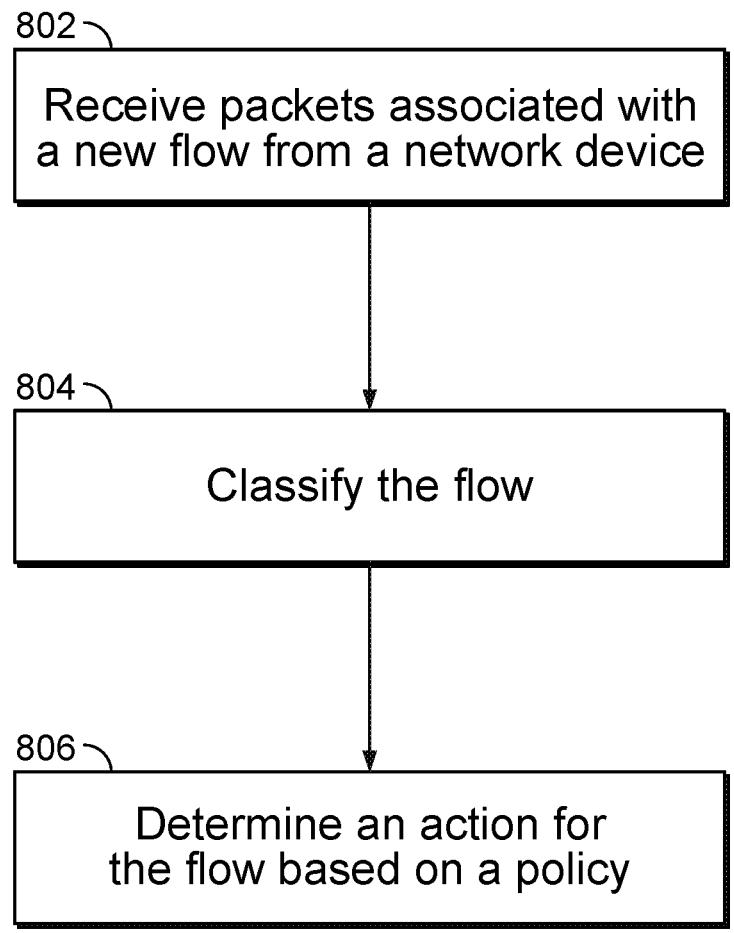
FIG. 8 is a flow diagram for providing packet classification for network routing in accordance with some embodiments.

FIG. 8 is a flow diagram for providing packet classification for network routing in accordance with some embodiments. At 802, receiving packets associated with a new flow at a security controller from a network device is performed, in which the network device performs packet forwarding. At 804, classifying the flow is performed. For example, classification can be based on port, IP address, application, user, device, and/or various other aspects, such as described herein with respect to various embodiments. At 806, determining an action for the flow based on a policy (e.g., a security policy) is performed. In some embodiments, the network device is a Software Defined Network (SDN) network device (e.g., a packet forwarding device that supports the OpenFlow protocol or another protocol).

Figure 9:
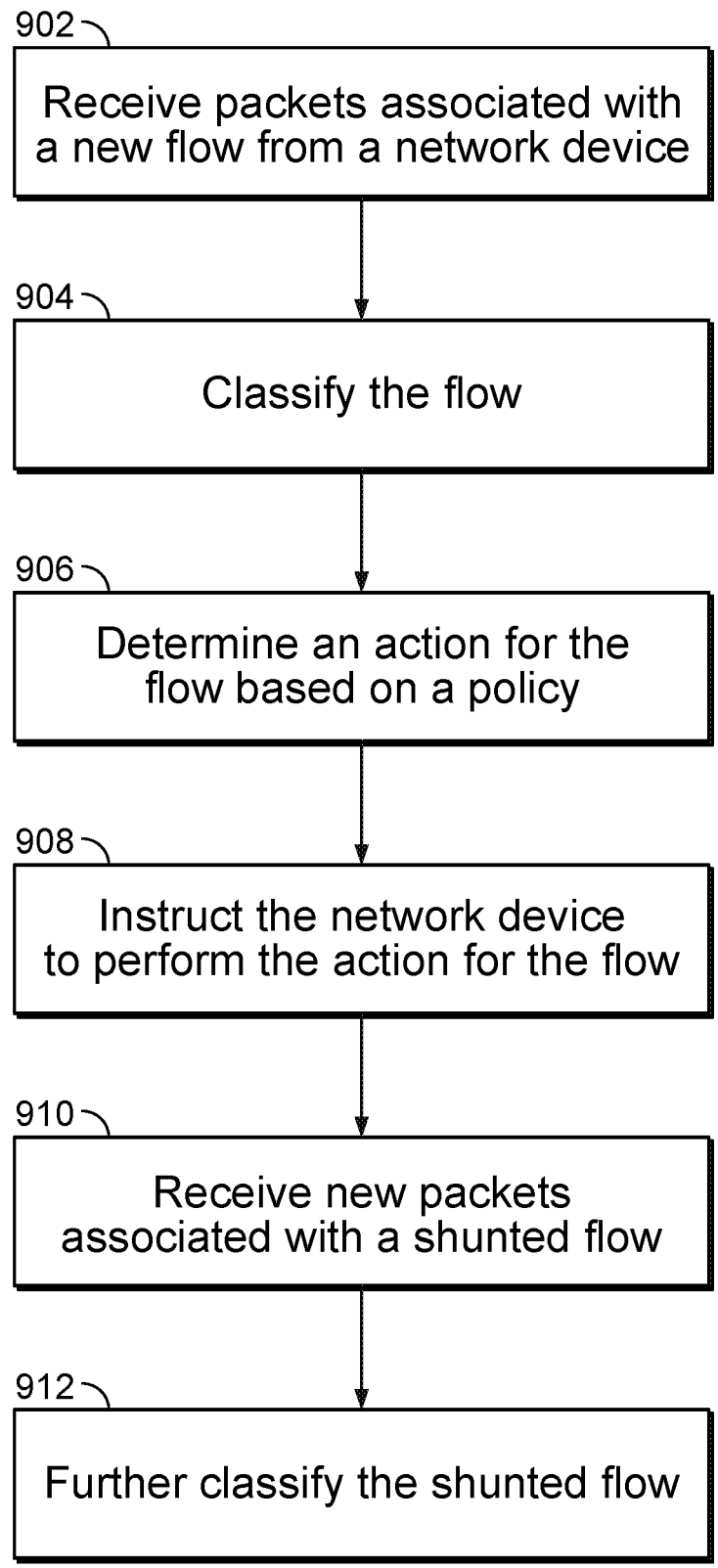
FIG. 9 is another flow diagram for providing packet classification for network routing in accordance with some embodiments.

FIG. 9 is another flow diagram for providing packet classification for network routing in accordance with some embodiments. At 902, receiving packets associated with a new flow at a security controller from a network device is performed, in which the network device performs packet forwarding. At 904, classifying the flow is performed. For example, classification can be based on port, IP address, application, user, device, and/or various other aspects, such as described herein with respect to various embodiments. At 906, determining an action for the flow based on a policy (e.g., a security policy) is performed. In some embodiments, the network device is a Software Defined Network (SDN) network device (e.g., a packet forwarding device that supports the OpenFlow protocol or another protocol). At 908, instructing the network device to perform the action for the flow is performed (e.g., using an API mechanism or a tagging mechanism). At 910, receiving new packets associated with a shunted flow at the security controller from the network device is performed. At 912, further classifying the shunted flow is performed. For example, based on such further classification and a security policy, the shunted flow can be determined to be a flow that can be ignored or dropped, in which case an appropriate action based on the determination can be communicated to the network device from the security controller.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for a security controller that performs packet classification for network routing, comprising:
    a processor of the security controller configured to:
        receive packets associated with a new flow from a network device, wherein the network device performs packet forwarding;
        classify the flow;
        determine an action for the flow based on a policy;
        instruct the network device via an interface to perform the action for the flow;
        receive new packets associated with a shunted flow at the security controller from the network device, wherein the shunted flow is a flow that is to be ignored or dropped based on further inspection;
        further classify the shunted flow, comprising to:
            determine a type of traffic related to the shunted flow, the type of traffic including HTTP traffic, HTTPS traffic, FTP traffic, SSL traffic, SSH traffic, DNS requests, unclassified application traffic, or any combination thereof;
            extract username, password, or a combination thereof being submitted to an external site from the new packets to determine a user; and
            perform application signature matching based on the type of traffic to determine an application to be associated with the shunted flow; and
        determine another action for the shunted flow based on a packet classification of a packet associated with the shunted flow, the user, and another policy; and
    a memory coupled to the processor and configured to provide the processor with instructions.

2. The system recited in claim 1, wherein the security controller is implemented using a cloud security service.

3. The system recited in claim 1, wherein the network device is a Software Defined Network (SDN) network device.

4. The system recited in claim 1, wherein the policy is a security policy.

5. The system recited in claim 1, wherein the instructing of the network device to perform the action for the flow comprises to:
    instruct the network device to perform the action for the flow using an application programming interface (API) mechanism.

6. The system recited in claim 1, wherein the instructing of the network device to perform the action for the flow comprises to:
    instruct the network device to perform the action for the flow by tagging a packet associated with the flow.

7. The system recited in claim 1, wherein the action is to drop the flow.

8. The system recited in claim 1, wherein the action is to ignore the flow.

9. The system recited in claim 1, wherein the action is to shunt the flow.

10. A method of a security controller that performs packet classification for network routing, comprising:
    receiving packets associated with a new flow from a network device at the security controller, wherein the network device performs packet forwarding;
    classifying the flow;
    determining an action for the flow based on a policy;
    instructing the network device via an interface to perform the action for the flow;
    receiving new packets associated with a shunted flow at the security controller from the network device, wherein the shunted flow is a flow that is to be ignored or dropped based on further inspection;
    further classifying the shunted flow, comprising:
        determining a type of traffic related to the shunted flow, the type of traffic including HTTP traffic, HTTPS traffic, FTP traffic, SSL traffic, SSH traffic, DNS requests, unclassified application traffic, or any combination thereof;
        extracting username, password, or a combination thereof being submitted to an external site from the new packets to determine a user; and
        performing application signature matching based on the type of traffic to determine an application to be associated with the shunted flow; and
    determining another action for the shunted flow based on a packet classification of a packet associated with the shunted flow, the user and another policy.

11. The method of claim 10, wherein the security controller is implemented using a cloud security service.

12. The method of claim 10, wherein the network device is a Software Defined Network (SDN) network device.

13. The method of claim 10, wherein the instructing of the network device to perform the action for the flow comprises:
    instructing the network device to perform the action for the flow using an application programming interface (API) mechanism.

14. The method of claim 10, wherein the instructing of the network device to perform the action for the flow comprises:
    instructing the network device to perform the action for the flow by tagging a packet associated with the flow.

15. The method recited in claim 10, wherein the action is to drop the flow.

16. The method recited in claim 10, wherein the action is to ignore the flow.

17. The method recited in claim 10, wherein the action is to shunt the flow.

18. A computer program product for a security controller that performs packet classification for network routing, the computer program product being embodied in a tangible, non-transitory computer readable storage medium and comprising computer instructions for:
    receiving packets associated with a new flow from a network device at the security controller, wherein the network device performs packet forwarding;

classifying the flow;

determining an action for the flow based on a policy;

instructing the network device via an interface to perform the action for the flow;

receiving new packets associated with a shunted flow at the security controller from the network device, wherein the shunted flow is a flow that is to be ignored or dropped based on further inspection;

further classifying the shunted flow, comprising:

determining a type of traffic related to the shunted flow, the type of traffic including HTTP traffic, HTTPS traffic, FTP traffic, SSL traffic, SSH traffic, DNS requests, unclassified application traffic, or any combination thereof;

extracting username, password, or a combination thereof being submitted to an external site from the new packets to determine a user; and performing application signature matching based on the type of traffic to determine an application to be associated with the shunted flow; and determining another action for the shunted flow based on a packet classification of a packet associated with the shunted flow, the user and another policy.

19. The computer program product recited in claim 18, wherein the security controller is implemented using a cloud security service.

20. The computer program product recited in claim 18, wherein the network device is a Software Defined Network (SDN) network device.

\* \* \* \* \*